(12) United States Patent
Maida-Smith et al.

(10) Patent No.: US 7,499,937 B2
(45) Date of Patent: Mar. 3, 2009

(54) NETWORK SECURITY DATA MANAGEMENT SYSTEM AND METHOD

(75) Inventors: Kathy Maida-Smith, Houston, TX (US); Steven W. Engle, Garland, TX (US)

(73) Assignee: Metasecure Corporation, Houston, TX (US)

( * ) Notice: Subject to any disclaimer, the term of this patent is extended or adjusted under 35 U.S.C. 154(b) by 767 days.

(21) Appl. No.: 10/804,775

(22) Filed: Mar. 19, 2004

(65) Prior Publication Data

US 2004/0205356 A1  Oct. 14, 2004

Related U.S. Application Data

(63) Continuation-in-part of application No. 09/990,194, filed on Nov. 21, 2001, now abandoned, which is a continuation of application No. 09/444,937, filed on Nov. 22, 1999, now abandoned.

(51) Int. Cl.
*G06F 17/30* (2006.01)
(52) U.S. Cl. .......................... 707/102; 707/101; 707/10

(58) Field of Classification Search ............... 707/1–10, 707/100–104.1, 200–206; 715/175; 726/4, 726/1, 26, 28; 709/223, 224, 204, 205; 714/38; 370/255; 717/103, 120, 127, 159, 178; 712/37; 711/101; 718/1; 706/47
See application file for complete search history.

(56) References Cited

U.S. PATENT DOCUMENTS

| | | | | | |
|---|---|---|---|---|---|
| 5,905,856 | A | * | 5/1999 | Ottensooser | 714/38 |
| 5,949,976 | A | * | 9/1999 | Chappelle | 709/24 |
| 5,987,611 | A | * | 11/1999 | Freund | 726/4 |
| 6,023,694 | A | * | 2/2000 | Kouchi et al. | 707/2 |
| 6,101,539 | A | * | 8/2000 | Kennelly et al. | 709/223 |
| 6,137,782 | A | * | 10/2000 | Sharon et al. | 370/255 |
| 6,173,437 | B1 | * | 1/2001 | Polcyn | 717/100 |
| 6,182,275 | B1 | * | 1/2001 | Beelitz et al. | 717/175 |

* cited by examiner

*Primary Examiner*—Diane Mizrahi
(74) *Attorney, Agent, or Firm*—Conley Rose, P.C.

(57) ABSTRACT

A system for compiling security data from an information network includes at least two network components, each providing data. A data partner is coupled to the network components. The data parser has access to two parser scripts that correspond to the network's component data. Categorized data can be produced by applying the parser scripts to the data received from the network components.

16 Claims, 10 Drawing Sheets

ELEMENT TABLE

706

| XACTION ID | ELEMENT ID | NAME | DESCRIPTION |
|---|---|---|---|
| X200154 | E312073 | DATE | DATE OF NETWORK TRANSACTION |
| X200154 | E312074 | TIME | TIME OF NETWORK TRANSACTION |
| X200154 | E312075 | ACTION | TRANSACTION TYPE |
| X200154 | E312076 | SOURCE_IF | NAME OF SOURCE FIREWALL NETWORK INTERFACE |
| X200154 | E312077 | DESTINATION_IF | NAME OF DESTINATION FIREWALL NETWORK INTERFACE |
| X200154 | E312078 | SOURCE_ADDRESS | SOURCE IP ADDRESS OF PACKET |
| X200154 | E312079 | DESTINATION_ADDRESS | DESTINATION IP ADDRESS OF PACKET |
| X200154 | E312080 | PROTOCOL | IP PROTOCOL OF PACKET |
| X200154 | E312081 | SOURCE_PORT | SOURCE PORT NUMBER/ SERVICE NAME OF PACKET OR ICMP TYPE |
| X200154 | E312082 | DESTINATION_PORT | DESTINATION PORT NUMBER/ SERVICE NAME OF PACKET OR ICMP TYPE |
| X200154 | E312083 | PACKETS_SENT | NUMBER OF PACKETS PASSED FROM SOURCE TO DESTINATION |
| X200154 | E312084 | PACKETS_RECEIVED | NUMBER OF PACKETS PASSED FROM DESTINATION TO SOURCE |
| X200154 | E312085 | BYTES_SENT | NUMBER OF BYTES PASSED FROM SOURCE TO DESTINATION |
| X200154 | E312086 | BYTES_RECEIVED | NUMBER OF BYTES PASSED FROM DESTINATION TO SOURCE |
| X317189 | E444120 | DATE | DATE OF MEASUREMENT |
| X317189 | E444121 | TIME | TIME OF MEASUREMENT |
| X317189 | E444122 | CPU IDLE | PERCENT CPU IDLE |
| X317189 | E444123 | SYSTEM PERCENTILE | PERCENT OF CPU USED FOR SYSTEM TASKS |
| X317189 | E444124 | I/O PERCENTILE | PERCENT OF CPU USED FOR I/O TASKS |
| X317189 | E444125 | USER PERCENTILE | PERCENT OF CPU USED FOR USER TASKS |

ELEMENT TABLE

| LEGAL VALUE | DATA UNIT | REFRESH PERIOD | SAMPLE PERIOD | PERIOD UNIT | AGGREGATE |
|---|---|---|---|---|---|
| DATE_ISO | N_A | ASYNC | SYNC | N_A | N_A |
| TIME_24 | N_A | ASYNC | SYNC | N_A | N_A |
| CHAR | N_A | ASYNC | SYNC | N_A | N_A |
| ALPHANUMERIC | N_A | ASYNC | SYNC | N_A | N_A |
| ALPHANUMERIC | N_A | ASYNC | SYNC | N_A | N_A |
| IP_4 | N_A | ASYNC | SYNC | N_A | N_A |
| IP_4 | N_A | ASYNC | SYNC | N_A | N_A |
| IP_PROTOCOL | N_A | ASYNC | SYNC | N_A | N_A |
| ALPHANUMERIC | N_A | ASYNC | SYNC | N_A | N_A |
| ALPHANUMERIC | N_A | ASYNC | SYNC | N_A | N_A |
| UNSIGNED_INT_32 | COUNT | ASYNC | SYNC | N_A | N_A |
| UNSIGNED_INT_32 | COUNT | ASYNC | SYNC | N_A | N_A |
| UNSIGNED_INT_32 | COUNT | ASYNC | SYNC | N_A | N_A |
| UNSIGNED_INT_32 | COUNT | ASYNC | SYNC | N_A | N_A |
| DATE_ISO | N_A | 1 | 10 | MINUTE | AVERAGE |
| TIME_24 | N_A | 1 | 10 | MINUTE | AVERAGE |
| UNSIGNED_INT_16 | PERCENT | 1 | 10 | MINUTE | AVERAGE |
| UNSIGNED_INT_16 | PERCENT | 1 | 10 | MINUTE | AVERAGE |
| UNSIGNED_INT_16 | PERCENT | 1 | 10 | MINUTE | AVERAGE |
| UNSIGNED_INT_16 | PERCENT | 1 | 10 | MINUTE | AVERAGE |

FIG. 7A-2

DELIMITED FLAT FILE TABLE 708

| ELEMENT ID | ENCODING | RECORD NUMBER | FIELD NUMBER | SUBFIELD DELIMITED | SUBFIELD NUMBER | START IN FIELD | END IN FIELD |
|---|---|---|---|---|---|---|---|
| E312073 | ASCII_7_BIT | ALL | 1 | NONE | 0 | 0 | 0 |
| E312074 | ASCII_7_BIT | ALL | 2 | NONE | 0 | 0 | -1 |
| E312075 | ASCII_7_BIT | ALL | 3 | NONE | 0 | 0 | 0 |
| E312076 | ASCII_7_BIT | ALL | 4 | / | 1 | 0 | 0 |
| E312077 | ASCII_7_BIT | ALL | 4 | / | 2 | 0 | 0 |
| E312078 | ASCII_7_BIT | ALL | 5 | NONE | 0 | 0 | 0 |
| E312079 | ASCII_7_BIT | ALL | 6 | NONE | 0 | 0 | 0 |
| E312080 | ASCII_7_BIT | ALL | 7 | NONE | 0 | 0 | 0 |
| E312081 | ASCII_7_BIT | ALL | 8 | NONE | 0 | 0 | 0 |
| E312082 | ASCII_7_BIT | ALL | 9 | NONE | 0 | 0 | 0 |
| E312083 | ASCII_7_BIT | ALL | 10 | NONE | 0 | 0 | 0 |
| E312084 | ASCII_7_BIT | ALL | 11 | NONE | 0 | 0 | 0 |
| E312085 | ASCII_7_BIT | ALL | 12 | NONE | 0 | 0 | 0 |
| E312086 | ASCII_7_BIT | ALL | 13 | NONE | 0 | 0 | 0 |

FIG. 7B

FIXED FORM FLAT FILE TABLE 710

| ELEMENT ID | ENCODING | RECORD NUMBER | START IN RECORD | END IN RECORD |
|---|---|---|---|---|
| E444120 | ASCII_7_BIT | ALL | 1 | 10 |
| E444121 | ASCII_7_BIT | ALL | 12 | 19 |
| E444122 | ASCII_7_BIT | ALL | 21 | 23 |
| E444123 | ASCII_7_BIT | ALL | 24 | 26 |
| E444124 | ASCII_7_BIT | ALL | 27 | 29 |
| E444125 | ASCII_7_BIT | ALL | 30 | 32 |

FIG. 7C

FIG. 9
$\Bigg\{$
1999/10/2709:00:00043004010023
1999/10/2709:10:00022003005010
1999/10/2709:20:00043004010023
1999/10/2709:30:00043004010023
1999/10/2709:40:00043004010023
1999/10/2709:50:00043004010023

S0214_X317189 DATA TABLE

| DATE | TIME | CPU IDLE | SYSTEM PERCENTILE | I/O PERCENTILE | USER PERCENTILE |
|---|---|---|---|---|---|
| 1999/10/27 | 9:00:00 | 43 | 4 | 10 | 23 |
| 1999/10/27 | 9:10:00 | 22 | 3 | 5 | 10 |
| 1999/10/27 | 9:20:00 | 43 | 4 | 10 | 23 |
| 1999/10/27 | 9:30:00 | 43 | 4 | 10 | 23 |
| 1999/10/27 | 9:40:00 | 43 | 4 | 10 | 23 |
| 1999/10/27 | 9:50:00 | 43 | 4 | 10 | 23 |

FIG. 10

NETWORK SECURITY DATA MANAGEMENT SYSTEM AND METHOD

The present application is a continuation-in-part of prior filed U.S. patent application Ser. No. 09/990,194 filed Nov. 21, 2001, now abandoned, which is a continuation of U.S. patent application Ser. No. 09/444,937 filed Nov. 22, 1999, now abandoned.

TECHNICAL FIELD OF THE INVENTION

The present invention relates in general to monitoring data networks and more particularly to a data management system and method for compiling and displaying network security data.

BACKGROUND OF THE INVENTION

Network providers want the advantages of accessing outside resources, such as those available on the Internet, but do not want those contacts to result in threats of unauthorized information release, modification of internal records, or network downtime. They also need to protect the network from unauthorized actions performed by internal users. In order to counter those problems, a typical information technology network may include many network components that collect security data or perform functions safeguarding the confidentiality, integrity, or availability of the network, its attached systems, application software, and data. Examples of such network components include firewalls, proxy servers, intrusion detection systems, routers, and availability monitors. Each of those network components either collects or has access to data that is useful to network security and administration personnel.

Collecting and using the security data available in a typical network may be difficult and time consuming. The data provided by each network component may be organized into a series of categories that are inconsistent with the categories used by another network component. Even when identical categories can be identified, the data may be stored in different formats. For example, one number might be represented in floating point format while another number corresponding to the same quantity may be represented in fixed point format.

As a result of the dissimilar organization and formats of the security data and the resulting time and effort that would be required to transform it into a usable form and to maintain that transformation as the data category or format changes, the network components that make up a typical network may not be configured to compile and store this data. Later, if a confidentiality, integrity or availability problem is suspected of having occurred, this data would not be available to confirm this. If the data was compiled and stored, it can be accessed in an attempt to reconstruct the relevant time period. The data from each network component is typically analyzed separately, though even the data from a single network component may be difficult to analyze because of an upgrade or change in software that changed the data output format. Thus, network security personnel typically do not have the resources to monitor the contemporary security data available from their networks. Even if a security concern is noted, the historical data may be available only on a component-by-component basis, if at all.

From the foregoing, it may be appreciated that a need has arisen for a system that compiles security data available from network components. A need has also arisen for a system that parses differently-organized data into records having a consistent labeling and access structure.

Further, a need has arisen for a system that manages data having several formats. Additionally, a need has arisen for a system that stores the information used to parse and format different data so that it can be updated, if necessary, upon a software change or upgrade. A need has also arisen for a system that can display contemporary security data from the network components in response to database queries. Each of those needs is independent and can be addressed without addressing the other identified needs.

SUMMARY OF THE INVENTION

In accordance with the present invention, a method and system for managing network security data is provided, embodiments of which substantially eliminate or reduce at least some of the disadvantages and problems associated with typical systems for handling security data.

According to one embodiment of the present invention, a method for building a system including a database of data templates is provided that includes identifying sets of data categories, each set corresponding to security data received from one of the network components. Database strictures are constructed with subdivisions matching the sets of data categories. Parser scripts are written that receive security data from network components and output records corresponding to the database record definitions. The parser scripts are then stored.

According to another embodiment of the present invention, a system for compiling security data from an information network is provided. That system includes at least two network components, each providing data in a different format. The data parser is coupled to the network components. The data parser has access to two parser scripts and is operable to produce categorized data from the network component's data using the parser scripts.

According to another embodiment of the present invention, a method for compiling network security data is provided that includes collecting the data from at least two network components. Parsing scripts corresponding to the network components are accessed and applied to the data from the network components data using the parser script.

Embodiments of the method and system for managing network security information of the present invention provide various technical advantages over typical security information systems and methods. For example, one technical advantage is facilitating real time access to security information. Another technical advantage is in reducing the need for extensive security personnel, each monitoring the output of different security network components. Yet another technical advantage is in allowing automated detection of events defined by information from multiple network components. Still another technical advantage is allowing relational database queries of security information from multiple network components.

Another technical advantage is facilitating updates of information defining the data structures used by network components. Another technical advantage is facilitating the compilation of security data from a network whose network components are often replaced. Some of the embodiments of the invention may not provide every technical advantage identified. No one technical advantage is an essential element of the invention. Other technical advantages are readily apparent to one skilled in the art from the following figures, description, and claims.

BRIEF DESCRIPTION OF THE DRAWINGS

For a more complete understanding of the present invention and the advantages of the embodiment thereof, reference is now made to the following description taken in conjunction with the accompanying drawings, wherein like reference numerals represent like elements, in which:

FIGS. 6 and 7 illustrate a meta-data database update prepared in accordance with one embodiment of the invention;

FIG. 9 illustrates transaction data received from a network component; and

FIG. 10 illustrates the data of FIG. 9 in a global database table.

DETAILED DESCRIPTION OF THE INVENTION

Figure 1:
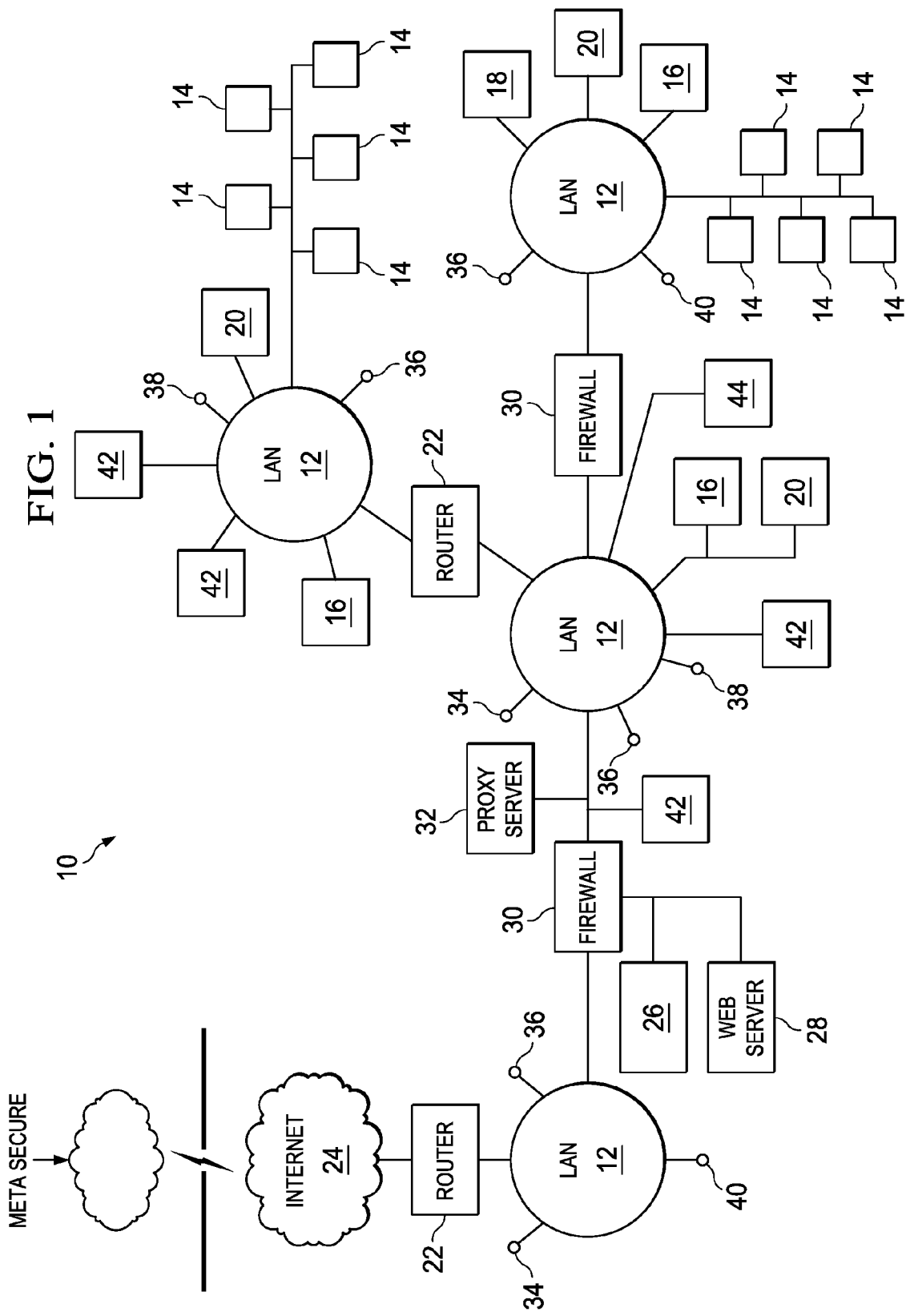
FIG. 1 illustrates a block diagram of an information technology network that produces security data and includes a system for compiling that security data.

FIG. 1 is a block diagram of an information technology network 10 that produces security information. Information technology network 10 includes network rings 12 that connect network components. Those network rings 12 can be of any of the many types known to network engineers, including token rings and fiber hubs. The network rings 12 can include connections to user workstations 14 and file servers 16. Intranet services are can be made available to user workstations 14 by file transfer protocol (FTP) servers 18 and web servers 20. Routers 22 analyze and direct information packets propagating between network components or to the Internet 24. Firewalls 30 can be included to control access into the network 10 and to control outside use of an Internet-available FTP server 26 and web server 28. A proxy server 32 can be provided in order to monitor internal requests for information from the Internet 24 and can be configured to block some of those requests based on various criteria. Each network ring 12 can also be coupled to security network components that perform intrusion detection 34, availability monitoring 36, utilization monitoring 38, and alerting 40. An availability monitoring component 36 can monitor the availability of the network, of a host, of an application, or of a combination of those. Utilization monitoring 38 can also apply to any or all of those three targets. The security of an information technology network encompasses the confidentiality, integrity, and availability of the software and data that it and its attached network components store, transfer, and process. Some network security components require or can be used with separate management stations 42. In an embodiment of the present invention a system for compiling security data 44 is coupled to the information technology network 10 such that security data can be received from the network components over the network 10.

Figure 2:
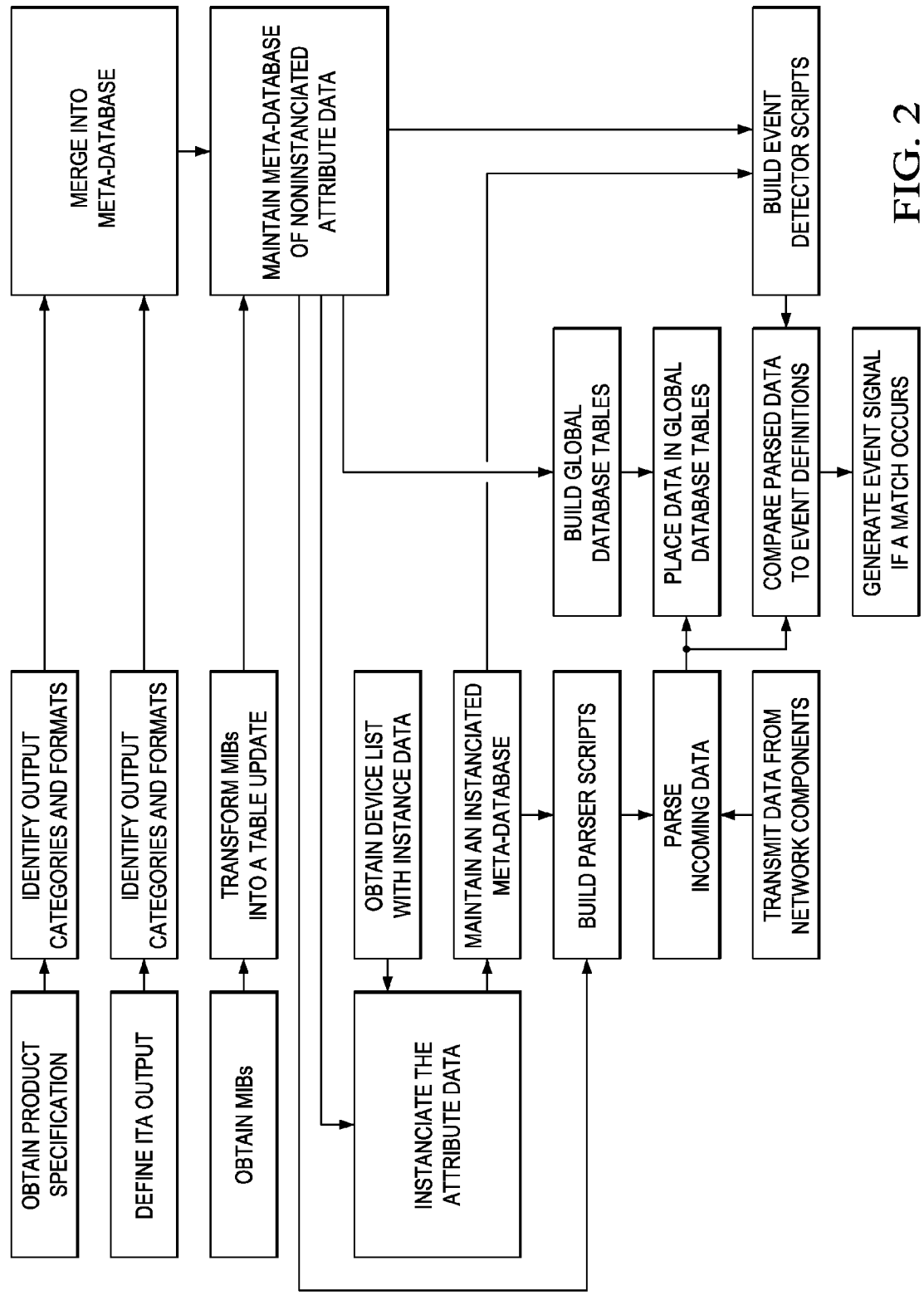
FIG. 2 illustrates a flow chart of a method for building and utilizing a security data database.

FIG. 2 is a flow chart of an embodiment of the invention illustrating a method for building and utilizing a security data database. Three of the possible methods by which network component output information can be obtained are demonstrated. First, a specification for the product in question can be obtained. From that specification a person with information technology network experience can identify the categories of data, that the network component outputs, for example in a syslog or via Simple Network Management Protocol (SNMP). Individual elements within the network component's output can be located based on absolute position within the line or a record of data, via delimiters which indicate the start and stop of each element, or a combination of those methods. In addition, the specification can describe the format in which the output is provided. For example, quantitative numerical data can be provided in floating point, fixed point, integer, or textual format. Attribute data is the combined category and format information. The category and format information, attribute data, is compiled with identification of the type of network component to which it corresponds into a table update. The table update is then merged into a meta-database, see, e.g., FIGS. 6 and 7.

A meta-database is a database containing data describing other data. In one embodiment that database stores information which indicates the categories of output data from a network component and the format of data in those categories, providing a template of the output. The idea of a template can be explained in reference to a letter template on a word processor that stores information about where on the page the address and date are located, as well as the format in which the date and address are presented. For example, a date can be either in European format, where the day precedes the month, or American format, where the month precedes the day. The actual database software used to store the meta-data can be Oracle, SQL Server, or other well-known databases.

A second way of obtaining network component output information utilizes the Simple Network Management Protocol (SNMP) and a Management Information Base (MIB). A MIB, provided by the manufacturer of the network component in the form of a flat file, describes the data that can be extracted from the network component via SNMP and documents the syntax for extraction. Software MIB compilers are available for converting a MIB into a software application's internal form. This software application would then be capable, using SNMP, to extract data from the corresponding network component. A compiler which converts the MIB into a data construct appropriate for the meta-database can be programmed and is called an MIB integrator.

Applying the MIB integrator to the MIB is called integrating the MIB and results in a data construct including attribute data, syntax, and identification of the type of network component to which it corresponds. That data construct can be input directly into the meta-database.

A third method of obtaining attribute data can be used where the data is provided from the network component by an information technology agent (ITA). See the discussion of FIGS. 4 and 5 below for a more specific discussion of ITAs. In that case the output of the ITA must be analyzed to determine the categories and formats in which the data is transmitted. An ITA can also be documented, such that the documentation will define the categories and formats. Some network components will transmit security data through both their native systems and an ITA. In such a case, the product specification and the ITA output characteristics must be used.

Through use of the three methods already identified, a meta-database can be built and maintained. The attribute data in the meta-database is noninstanciated. Noninstanciated data is data that does not correspond to output from specific, physically present network components and instead corresponds to output from types of network components. For example, the attribute data for all routers having a certain product number is noninstanciated.

The identical attribute data that corresponds to a router having that product number but also having a specific serial number is instanciated. The advantage of maintaining a meta-database of noninstanciated attribute data will become apparent. One embodiment of employing the attribute data to compile security data requires that the data be instanciated. Other embodiments that access the noninstanciated meta-database for compiling security information can also be employed.

One way to instanciate the attribute data comprises compiling a list of network components with instance data. Instance data identifies which specific network components from which security data is desired are present in the information network 10. For example, the list might include routers 22 having a certain product number and identify two serial numbers of routers of that type that are in the network and from which security information is desired. Once a network component list with instance data is obtained, the attribute data can be instanciated.

Instantiating the data includes producing a group of attribute data records, which includes at least records corresponding to network components from which security data is desired that are physically present in the information network 10. The records are produced by comparing a network component listed in the device list to the network components for which the noninstanciated meta-database has attribute data, identifying the attribute data corresponding to that network component, and creating a new record for each instance of that network component. That new record would include both the attribute data and the instance identification, one possibility of identification is a serial number.

For example, if the device list includes a firewall with a specific product number and corresponding instance data showing two such firewalls from which security data is desired currently coupled to the network, then two new records of instantiated attribute data would be produced.

Figure 8:
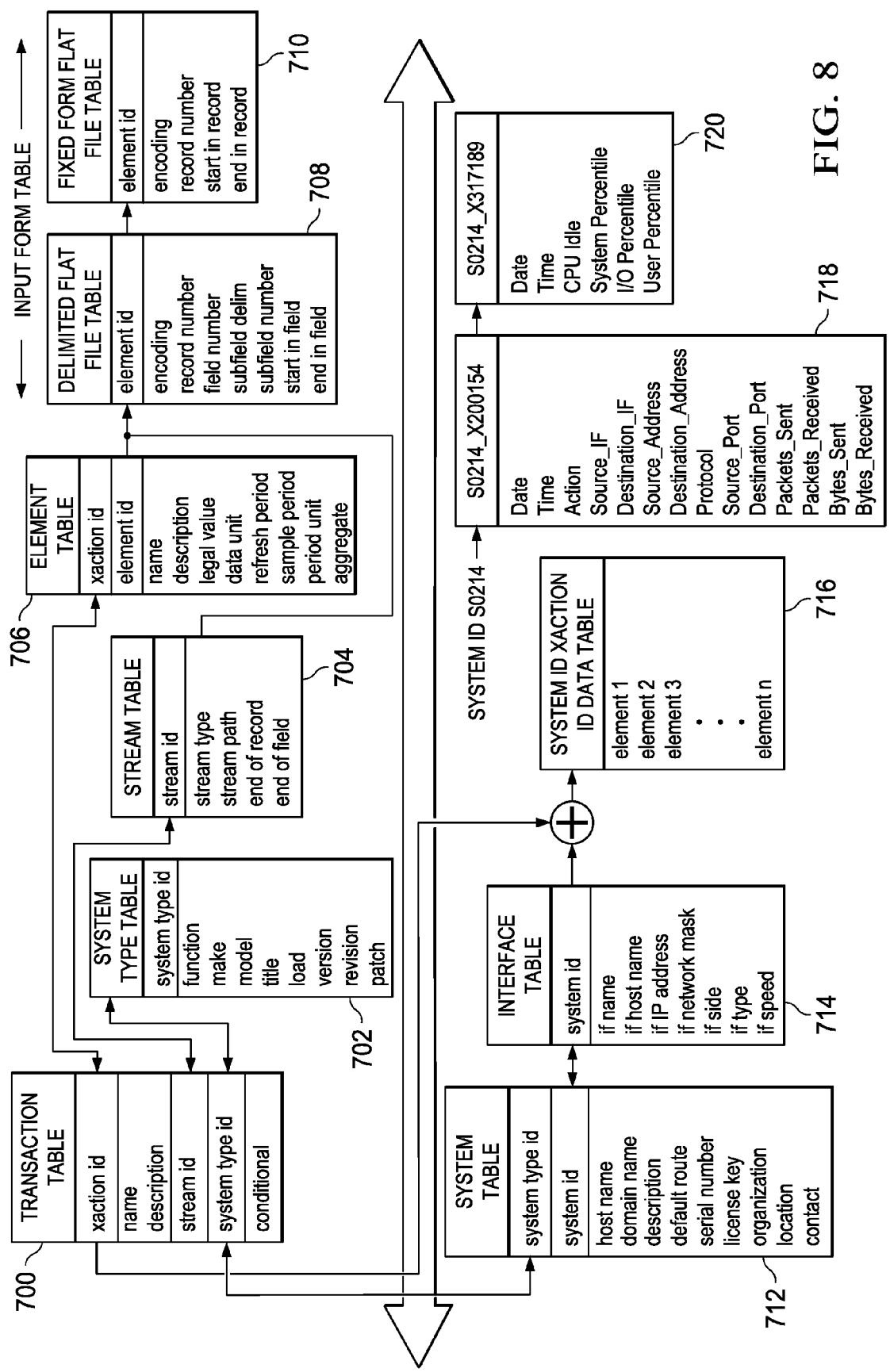
FIG. 8 illustrates a data relationship chart of an uninstanciated meta-data database, an instanciated meta-data database, and global database tables.

The firewalls would share a system type id but would have different system ids. A system table and interface table would be built for each physical firewall. FIG. 8 further details the tables built for instanciated meta-data. In an embodiment, the instanciated data for each firewall would reference the attribute data from the noninstanciated meta-database through the system type id, which is used to identify both instanciated and uninstanciated meta-data. Each would also include an identifier such as a system id.

The advantage of maintaining the noninstanciated meta-database can now be seen. If the processes of compiling a device list with instance data and instanciating the attribute data are both automated, changes in networks components from which security data is desired can be implemented automatically on a routine basis. If a proxy server 32 is switched for another model, a new instanciated meta-database can be created automatically as long as the uninstanciated meta-database includes attribute data for that new type of proxy server.

The instanciated meta-database is maintained and provides information for two functions. First, together with uninstanciated meta-data, it provides the information necessary to choose the parameters of the global database tables in which the security information will be stored. Second, it determines what parser scripts are necessary for data received from the network components and what uninstanciated meta-data must be accessed to construct those parsers.

In one embodiment, a global database table is built for each transaction of a network component from which security data is desired. For example, a specific type of firewall can provide two different security data outputs. If the network includes two physical firewalls of that type, the global database can include four tables. The tables are uniquely labeled in accordance with the system id and xaction id (transaction id). The instanciated meta-data associates a system type id with each physical network component from which data is desired. The uninstanciated meta-data can, based on the system type id, provide the template for each data output produced by that network component. The information from the instanciated and uninstanciated meta-data that is necessary to build a global database table is shown in FIG. 8.

Once the global database tables have been built, parser scripts can be produced for each output of a network component for which there is attribute data in the instanciated database. The flat file table and fixed form tables of FIG. 7, from the uninstanciated mete-data, contain parameters from which a parser script can be prepared.

Each network component chosen to provide security data can transmit that data to the system for processing by the corresponding parser scripts. That transmission can be performed under several known protocols such as Simple Network Management Protocol (SNMP) or syslog. Generally the transmission protocols used by the network 10 to send other data are used for security data as well. In general, parser scripts for a particular network component reformat the data received from that network component so it can be entered into the global database tables. If the output data from a network component does not include a category that is included in the global database table field, the parser script will reject the output. This filters out "garbage" data that does not need to be collected, processed or archived. If the received data is not rejected, the parser script arranges the data to match the categories and formats of records in the corresponding global database table. Categorized data is data that conforms to a record in a database table. Other embodiments of parser scripts are possible, for example, a parser scripts could recategorize but not reformat data received from network components.

Once the parser, using the parser scripts, has manipulated the information received from the network components, it loads the parsed data into the global database tables. The data can immediately be added to the corresponding table because it has been parsed. The data in the global tables is consistently labeled and accessible.

Before, or during, the global database load, the data interface can transmit the parsed data to an event detector. The event detector compares the parsed data to one or more event definitions. The event definitions can be formulated independent of the structure of the data from the network components because the event detector receives decomposed data. If the parsed data matches one of the event definitions, a signal is generated by the event detector indicating that the event occurred. The signal may be recorded, displayed to a network manager, or it may initiate an automatic change in the status of the network, among other possibilities. For example, an event might be an attempt to break into a computer system from a site on the Internet by exploiting a known computer system vulnerability. In that case connection and any further attempts to connect from that site could be blocked until the security vulnerability is resolved.

Figure 3:
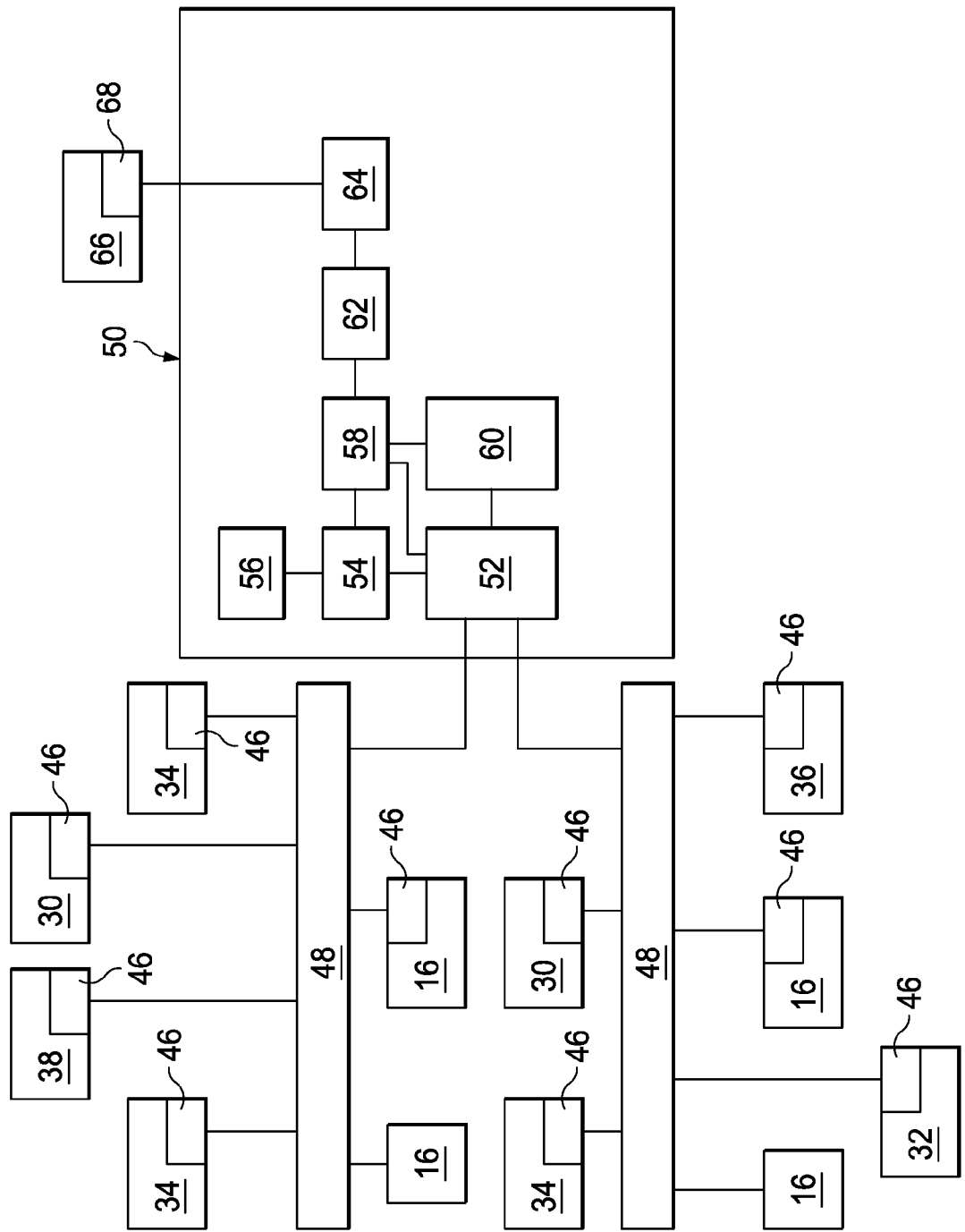
FIG. 3 illustrates a block diagram of a system for compiling and displaying security data from an information network.
Figure 4:
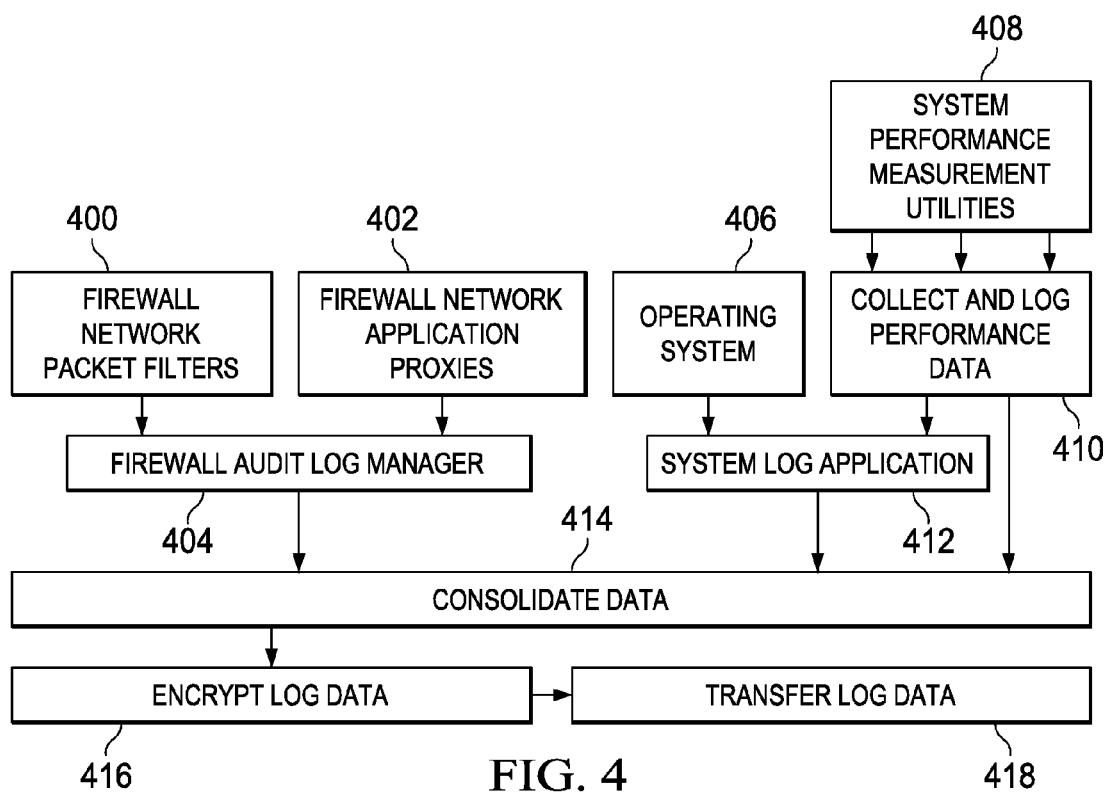
FIG. 4 illustrates a data flow chart for a firewall component with an information technology agent.
Figure 5:
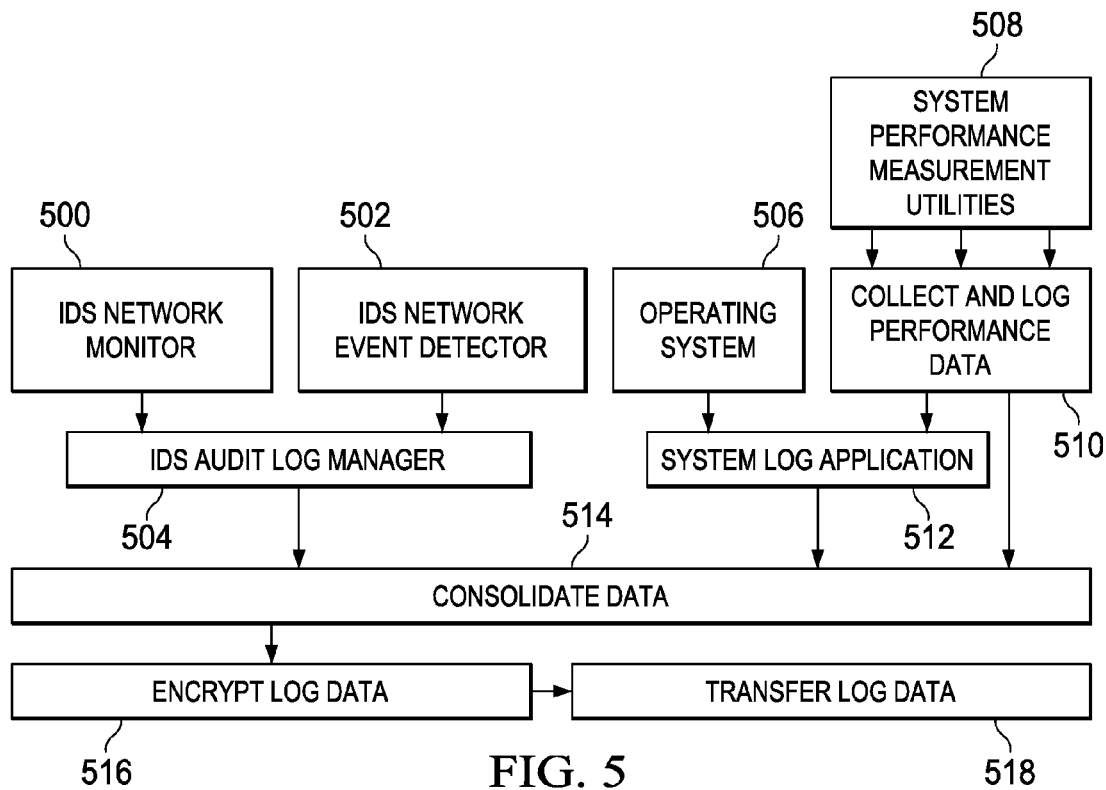
FIG. 5 illustrates a data flow chart for an intrusion detection system with an information technology agent.

FIG. 3 illustrates an embodiment of the invention in which a system compiles security information from network components through intermediaries and allows that information to be searched and displayed. The network components include a utilization monitor 38, firewall systems 30, intrusion detection systems 34, file servers 16, proxy server 46, and availability monitor 36. The file servers 16 can use various operating systems including UNIX and Windows NT. Information technology agents 46, TAs, can be deployed at network components to collect and transmit information. FIGS. 4 and 5 illustrate operation of example ITAs. For example, if a network component does not have the capacity to output security information to which it has access, it may be beneficial to deploy an ITA 46 to get that information. The ITAs 46 and network components without ITAs can transmit data to distributed data managers 48, DDMs. DDMs 48 are most useful in very large networks containing a multitude of network components providing security data, but they can be used in any size of network. In one embodiment, each DDM 48 utilizes parser scripts for the network components from which it receives data. In one embodiment, each DDM 48 utilizes parser scripts for the network components from which it receives data. In another embodiment, the DDM does not parse the data, but merely forwards it. In another embodiment, a DDM 48 is not used and all data is delivered directly to the Central Data Manager 50. DDMs 48 can forward data as they receive it or wait and forward data in batches according to the amount of data or a time interval. DDMs 48 can compress data before forwarding it. DDMs 48 can also encrypt data before forwarding it. The DDMs 48 forward data to the Central Data Manager 50, CDM.

The data is received at the data interface 52. If the data is encrypted or compressed, the data interface 52 returns it to its original form. In an embodiment where the DDMs do not parse the data, the data interface 52 can be provided with parser scripts in order to parse the data. The data interface 52 can be coupled to a data storage 54 to which the decomposed data is transmitted. Non-decomposed data can also be transmitted to the data storage 54. For more permanent storage the data, parsed and unparsed, can be transmitted to a tape library 56.

In one embodiment, data is delivered directly from the data interface 52 to a global database 58 for storage. The global database, when it is present, can include tables whose structures correspond to the categories and format of the parsed data as discussed with regard to FIG. 2. An event detector 60 can receive parsed data either directly from the data interface 52 or from the global database 58. The event detector 60 compares the parsed data to one or more event definitions and generates an event signal upon a match.

Coupled to the global database is an database interface 62 for receiving and responding to queries. The queries can be real time, in which case the data corresponding to the query is provided in the form required by the query at webserver 64 for forwarding to a web browser 66 or the database can be configured to produce reports at specified times that are stored in the webserver 64. The webserver 64 can be accessed by a webbrowser 66 having a java interpreter 68. Software is available for handling queries from a webbrowser 64 for most major software databases.

FIG. 4 illustrates one example of an information technology agent (ITA) 46 used with a firewall. Elements of the firewall, including firewall network packet filters 400 and firewall network application proxies 402, collect security information that is transmitted to the firewall audit log manager 404. Such information may include the time and data when a communication occurred, the source and destination ip addresses, the protocol used, the number of packets sent and received, and the number of bytes sent and received.

The firewall operating system 406 provides security information to the system log application 412. The system log application may provide information directly to a DDM 48 or the CDM 50, as well as to the ITA.

A firewall may include system performance measurement utilities 408 and software to collect and log performance data 410 produced by the utilities. Such data may include the percentage of time that a CPU is idle, and the percentage of time it is used for each of system tasks, input and output tasks, and user tasks. Like the system log application 412, performance data may be provided directly to a DDM 48 or the CDM 50. Some performance data may be provided to the system log application 412.

The ITA 46 consolidates the data received from the firewall audit log manager 404, the system log application 412, and system performance measurement utilities 408. The ITA 46 may compress or encrypt 416 the data before sending it 418 to a DDM 48 or the CDM 50. In order to provide an accuracy check, the ITA 46 may also hash data and attach the hash result to the data. Hashing is running the file through a mathematical algorithm that yields a fixed-length value or key that represents the original file. The mathematical algorithm is the hashing function. A hashing function is secure if it is computationally infeasible to find a file that corresponds to a given value or key, or to find two different files which produce the same value or key. For example, the Secure Hashing Algorithm (SHA-1) was made available by the National Institute of Standards and Technology on Apr. 17, 1995. The CDM 50 can, upon receiving the data, transform the file with the secure hashing function and check the key which was attached by the ITA 46. If the hashing function result matches the attached key, it is likely that the data was provided without corruption.

FIG. 5 illustrates one example of an information technology agent (ITA) 46 used with an intrusion detection system (IDS). Elements of the IDS, including IDS Network Monitor 500 and IDS network event detector 502, collect security information that is transmitted to the IDS audit manager log 504. While an IDS may provide different types of information, the flow of data to the ITA 46 and DDM 48 or CDM 50 in the embodiment of FIG. 5 is similar to the flow of data in FIG. 4 for the firewall. Thus IDS elements 506-512 provide information that the ITA 46 consolidates 514, encrypts 516, and transmits 518 to a DDM 48 or the CDM 50. The ITA may also compress or hash the data as discussed with reference to FIG. 4.

Figure 6:
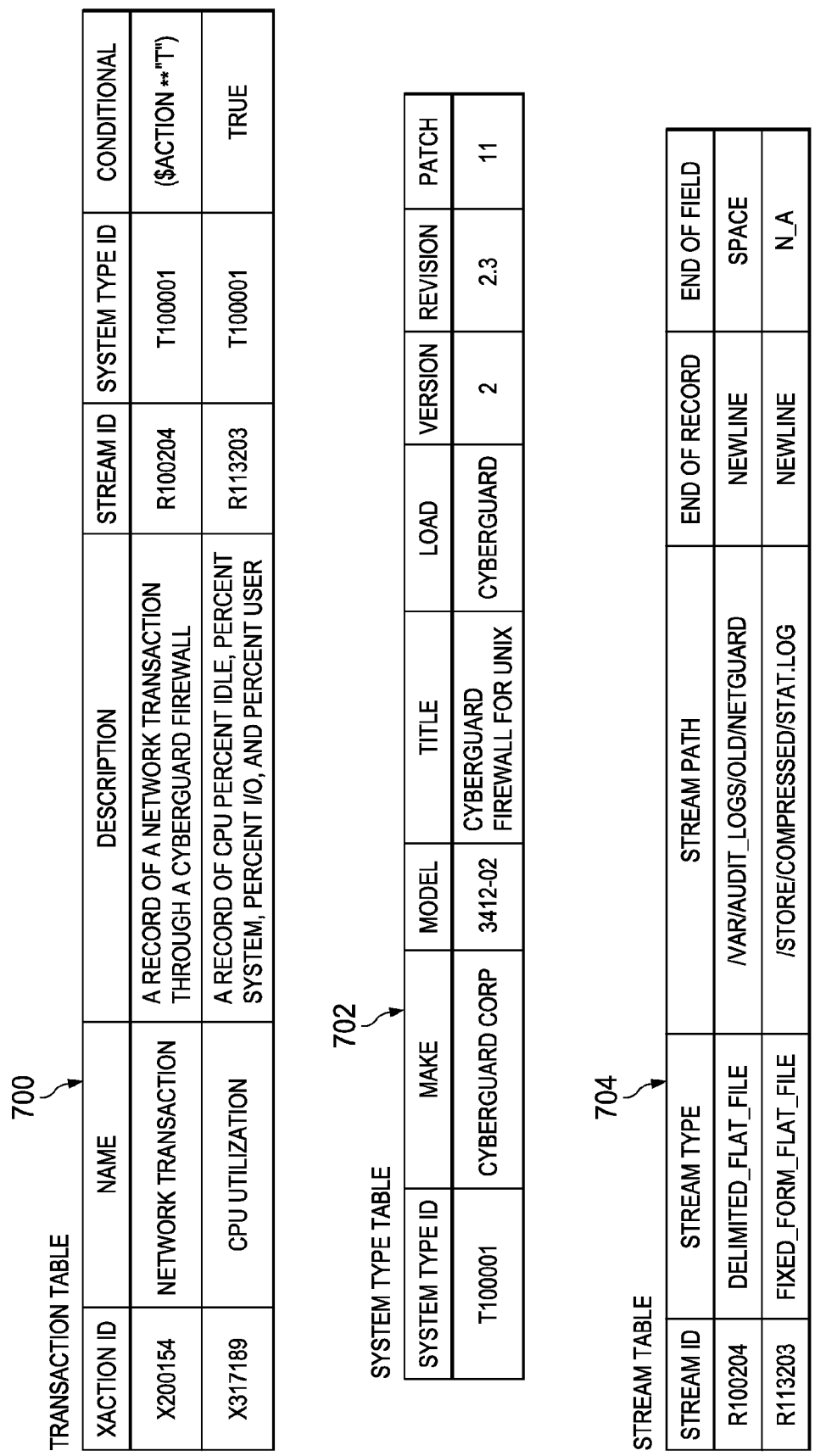

FIGS. 6 and 7 illustrate one embodiment of an uninstanciated meta-database. A meta-database includes several tables and updating a meta-database may involve adding records for each of those tables. The transaction table 700 includes records where each correspond to a record or group of data elements that is provided by one type of network component. The records include a name', identification code (xaction id') and description' of the transaction. The records also identify the ids of the type of network component that provides the transaction, the system type id', and the source of the data associated with the transaction, stream id'.

The system type table 702 includes records that each correspond to a type of network component that provides at least one transaction. That descriptive information is also used in formulating the device list with instance data, see FIG. 2, so that the meta-database can be instanciated. Once the descriptive information is used to identify the system type id', the transactions corresponding to that system type id be identified.

The stream table 704 includes records that specify the separation of streams by type, stream type'. For example, in a delimited flat file stream type elements are separated by a code. For that type of file, the stream identification table 704 includes that identification "DELIMITED FLAT FILE" and identifies the separartor, "space" in the figure. A fixed form flat file uses designated, unchanging points in the file to separate elements. The records also include the operating system nomenclature for the data location or source identified as the stream path.

Moving to FIG. 7, the element table 706 includes records for each element of each transaction. The records identify the transaction that includes the element, the elementid', descriptive information regarding the element, and the format of the element. For example, the network transaction includes a date which uses the DATEISO format. Numerical data may also be additionally characterized as a count or a percentage. Each element record includes information about the updating of that element by the network component. Each element can be associated with a stream through the transaction id, xaction id'. The transaction id is used to identify a record in the transaction table 700 which includes the corresponding stream id'.

The delimited flat file table 708 and fixed form flat file table 710 are both stream type tables and each includes records for the elements that are associated with a stream of that type. For example, because stream id T100204 is delimited flat file, the elements corresponding to that stream are listed in the delimited flat file table 708. Additional tables could be included for additional stream types.

The records in the stream type tables include the formatting information that identifies the element in the stream. That information is used to create the parsing scripts discussed in prior figures. For example, a parsing script for the fixed form flat file associated with xaction id X317189 is written to separate the first ten characters (each an ASCII 7-bit character) and insert them in the portion of the record labeled "Date" in the DATEISO format. The next eight characters are inserted in the "Time" portion of the record in TIME24 format. In the decomposition of transaction X200154, on the other hand, 7-bit ASCII is read until a space is found. The characters prior to the space are then inserted as "Date".

FIG. 8 illustrates a data relationship chart of an uninstanciated meta-data database, an instanciated meta-data database, and global database tables. The tables shown above the shaded bar are uninstanciated and correspond to the uninstanciated tables shown with records in FIGS. 6 and 7. The system table 712 and interface table 714 contain instanciated meta-data because they correspond to a network component that is physically present. Those tables are built from the device list with instance data discussed in FIG. 2. The system table 712 contains a record for each network component in the network. The fields contain the attributes of the physical network components including system type id, system id, host name, domain name, description, default route, serial number, license key, organization, location, and contact. While actual network components may share a system type id', each has a unique system id'.

The interface table 714 allows characterization of network component interfaces. While a network component has only one record in the system table 712, it can have multiple records in the interface table 714, each identifiable by the system id'. The interface table fields include system id', interface name', interface host name', 'interface IP address', interface networkmask, interface side', interface type and interface speed'. Each system id' is combined with the corresponding xaction to determine the names of the global database tables that must be built to receive data from the parsers for each system and transaction. Each global database table is labeled with the system id and the xaction id reflecting the transaction data for the system it will be storing. The global database table records include all the elements associated with the xaction in the element table 706 formatted in accordance with the "legal value" and encoding portion of those records and labeled in accordance with the "name" portion of those records.

The global database table S0214×200154 (718) corresponds to system id S0214, which corresponds to system type id T100001. It also corresponds to xaction id X200154 and the elements in its records are categorized to match the element records in the element table 706 that have X200154 in the xaction id field. As such it will be storing data for transaction X200154 for system S0214. The second table 720 corresponds to the same physical network component, S0214, but to a different transaction, X317189, of that system type. Consequently, the records of the second table 720 have different fields because they correspond to element records that have X317189 in the xaction id field. Because the parsers and the global database operate per the meta-data, the output of the parsers can be directly added to the global database tables in real time.

FIG. 9 illustrates transaction data received from a network component as a fixed form flat file and FIG. 10 illustrates the data of FIG. 9 in a global database table. The data parsers built in accordance with the present invention enable the consistent format of the global database tables. The data in the tables is labeled consistently regardless of the format in which the network component output the data. For example, the dates received in the X317189 transaction are labeled and formatted consistently with dates received in the X200154 transaction. As a result, the data can be subject to database table joins initiated by the relational database.

The meta-data can be used to structure the user interface and the database queries. The data can also be made available through well-known protocols such as ODBC to other software to promote interoperability and greater effectiveness. That other software can perform one of several functions such as fault detection and isolation decision support. Using the available data and meta-data, such software would be operable to display and alarm network-wide failures. It could also isolate the actual network component that failed and graphically show the scope of the failure. Determining the scope of the failure could include identifying additional network components that are dependant on the failed network component and thus unable to perform their functions. Separate software could implement an advanced artificial intelligence knowledge/rules based system to enable higher levels of automated event response such as targeted counter-measures, initiating fail over procedures, and performing additional data analysis.

Thus, it is apparent that there has been provided, in accordance with the present invention, a network security data management system and method that satisfies the advantages set forth above. Although embodiments has been described in detail, it should be understood that various changes, substitutions, and alterations can be made herein without departing from the spirit and scope of the present invention as defined by the following claims.

What is claimed is:

1. A method for compiling parser scripts each corresponding to the structure of security data received from a network component comprising the steps of:
 a) when executed by a computer, identifying sets of data categories, each set corresponding to security data received from one of a plurality of network components;
 b) when executed by a computer, constructing database record definitions, each defining a record subdivided in accordance with one of the sets of data categories;
 c) writing parser scripts that receive security data from the network components and output records, each record corresponding to one of the record definitions;
 d) storing said parser scripts;
 e) determining the format of each category in said sets; and
 f) formatting the subdivisions to match the formats of the categories of the set to which the definition corresponds; and wherein each of the output records of step (c) correspond in format to one of the record definitions.

2. The method of claim 1 further comprising the steps of:
- g) building database tables in a relational database each having the fields of one of the database record definitions; and
- h) inserting output records received from the parser scripts into the tables.

3. The method of claim 1 further comprising the steps of:
- i) building database tables in a relational database each having the fields and formats of one of the database record definitions; and
- j) inserting output records received from the data interface operating per defined data constructs into the tables.

4. The method of claim 1 wherein: at least one of the sets of data categories is identified, at least in part, from the product specifications of the network components.

5. The method of claim 1 wherein: at least one of the sets of data categories is identified, at least in part, by applying a Management Information Base (MIB) integrator to a Management Information Base for the corresponding network component.

6. An information network security data compilation system, comprising:
- a) a first network component;
- b) a second network component;
- c) a third network component; and
- d) when executed by a computer, a data parser that is coupled to the first and second network components has access to a first parser script and a second parser script, the data parser is operable to produce categorized data from the data received from the first and second network components data interface operating with the first and second parser scripts, respectively;
- b) when executed by a computer, a second data parser that is coupled to the third component has access to a third parser script, the second data parser operable to produce categorized data from the data received from the third network component with the third parser script; and
- c) a relational database coupled to the first and second data parsers.

7. The data compilation system of claim 6 wherein:
- a) the first network component is a firewall and
- b) the second network component is an intrusion detection system.

8. The data compilation system of claim 6 further comprising:
- a) a third network component and
- b) a distributed data manager; and wherein: the data parser is coupled to the second and third network components through the distributed data manager which collects and compresses data from the second and third network components and forwards the compressed data to the data parser.

9. The data compilation system of claim 6 further comprising:
- a) a display coupled to the data parser; and
- b) a relational database coupled between the data parser and the display, and wherein: the data parser transfers the categorized data to the relational database.

10. The data compilation system of claim 9 wherein: the relational database receives a data query, and the display shows a portion of the categorized data, up to and including all the data, from the relational database, corresponding to the data query.

11. The data compilation system of claim 10 wherein: the data queries are submitted and the portions are shown through a web browser interface.

12. The data compilation system of claim 6 further comprising:
- a) an event detector coupled to the data parser and wherein: the event detector compares the categorized data to a predetermined event definition and provides an event indication when a match is found.

13. The data compilation system of claim 6 further comprising: a) an information technology agent and wherein: the network component is programmed by software, the agent collects security data from the software, and the data provided from the first network component is the security data collected by the agent.

14. The data compilation system of claim 6 wherein: the data parser produces formatted and categorized data.

15. The data compilation system of claim 6 wherein: data from the first network component is security data and data from the second network component is security data.

16. The data compilation system of claim 6 wherein: data from the first network component is encrypted and decrypted.

* * * * *